United States Patent Office 3,462,254
Patented Aug. 19, 1969

3,462,254
METHOD OF COATING FIBERS AND FIBERS FORMED THEREFROM
Alfred Marzocchi, Cumberland, R.I., and Gerald E. Rammel, North Attleboro, Mass., assignors to Owens-Corning Fiberglas Corporation, a corporation of Delaware
No Drawing. Continuation-in-part of application Ser. No. 508,145, Nov. 16, 1965, which is a continuation-in-part of application Ser. No. 220,853, Aug. 31, 1962, which in turn is a division of application Ser. No. 11,956, Mar. 1, 1960. This application June 14, 1967, Ser. No. 645,865
Int. Cl. C03b 37/00
U.S. Cl. 65—3
12 Claims

ABSTRACT OF THE DISCLOSURE

A new and improved method of forming glass fibers wherein a fluid coating is applied to the fibers as they are formed from molten glass and thereafter the fluid coating is transformed to a gel before the fibers are collected into a package as by being wound into a coiled package.

Related applications

The present invention is a continuation in part of application 508,145, filed Nov. 16, 1965, which in turn is a continuation in part of application, Ser. No. 220,853, filed Aug. 31, 1962, which in turn is a division of the then copending application, Ser. No. 11,956, filed Mar. 1, 1960 all now abandoned.

Background of the invention

The present invention relates to a new and improved method of applying coatings to fibers, and particularly glass fibers at forming; and to gel-forming compositions suitable for coating on glass fibers.

The technology which has been developed for the production of glass fibers, presently makes possible the production of fibers having a diameter of from approximately 0.0001 inch to approximately 0.0004 inch, at a rate of from approximately 10,000 feet per minute to approximately 15,000 feet per minute. Glass fibers are produced from small streams of molten glass which exude through tiny orifices located in what is called a bushing. Conventionally, bushings have 204 such orifices. The tiny streams of molten glass which issue from the bushing are attenuated by pulling the fibers until the diameters given above result, and during which time the streams cool and rigidify into what are called filaments. These filaments are then coated with a protective film for the purpose of preventing glass to glass abrasion, during or immediately following which they are brought together to form a strand. This strand is coiled upon a spool or wheel to form a package. During formation of the package, the strand is traversed back and forth across the spool by a device which is called a traverse, and which is located between the point where the coating materials are applied, and the rotating spool on which the package is made. The spool is rotated by what is called a winding drum, and the pulling action supplied by the winding drum attenuates the molten streams of glass, pulls the filaments past the coating applicator, and through the traverse, and coils the strand onto the package. The winding drum is usually located approximately 10 feet from the bushing, so that the entire forming, coating and collecting or winding operation is carried out in a fraction of a second.

The problem of abrasion of glass upon glass is a serious one and has generally been a limiting factor in the rate at which this technology has developed. The seriousness of the problem has caused the wide spread theory that glass to glass abrasion can only be prevented by a solid film of material between the filaments to at all times assure physical separation of the filaments. Regardless of the validity of this theory its acceptance by the art has not caused the art to develop a coating which is completely satisfactory under all conditions for use in separating the filaments during forming. Where the strands are to be woven into textiles, it will be apparent that the amount of film forming materials which can be used must be held within certain percentages of the total weight of the strand in order that the strand will not be unduly stiff. Dyes will not color the glass itself, and so the coatings which are used must either be capable of being dyed, or must be capable of being removed, and later replaced by a material capable of being dyed. Where glass is to be used for reinforcing plastic materials, the bond between the coatings and the glass filaments is very important, as well as the compatibility of the coating with the later applied resin which the coated strand is intended to reinforce.

The technology in its forty some years of existence has examined all types of materials for their suitability as coatings on glass fibers in an attempt to find one which is "universal" in that fibers coated therewith can be used for all known subsequent uses of coated glass strand. The art has tried all kinds of resins, either as emulsions, or as solutions in organic solvents, but all lack some desired characteristics, and usually suffer from high tensions during weaving operations. In addition, organic solvents create explosion hazards. Explosion hazards require expensive equipment to overcome. In general, resins and other materials requiring organic solvents have not been better than coating materials which are soluble in aqueous media, so that the art has substantially universally used coating materials soluble in water. By and large, the most commonly used coating materials for protecting glass fibers during the forming operation comprise starch in some form. Although starch is not durable to the degree that it can stay in place on the filaments and provide protection after the fibers are woven, it has been without equal in its protection of the strands during the various abrasion producing operations that are involved preparatory to, and during weaving. In addition, methods have been developed, usually burning, which are quite satisfactory for removing the starch after weaving, so that any desired finish coatings can then be applied. The art has long desired to replace starch base coatings, which are only temporary in nature, with a single coating material which would perform as satisfactory as starch base materials during forming, and which would also act as a finish size which is capable of being dyed and which will permanently protect the filaments during use. The art would further like this coating material to be a "universal" one, so that it can be used regardless of the end use of the strand. Such a universal coating material for glass fibers has never been developed, and there is considerable belief in the art that one will never be developed, because of the great number of properties which such a material must have.

Coating materials, including starch base coating materials, must be quite fluid when applied to the filaments, in order that the coating materials will completely cover, or "wet out" the filaments in the short length of time that exists before they are brought together into a strand. The amount of "solids" that can be applied to the filaments, therefore, is limited by the degree of fluidity necessary to "wet out" the filaments. It is not possible to apply fluid coating materials in an amount which will completely "wet out" the strands without having an excess present, and a high percentage of the coating fluids brought in contact with the filaments is thrown into the surrounding area as a spray. In addition, the coating collects at different areas of the applicator and winding equipment which then either drips or is thrown to the floor. In all prior art processes with which applicants are aware, the degree of fluidity required necessitates that the coating fluids have only a small percentage of solids, and a high percentage of the coating materials that are carried with the strand into the coiled package is the solvent. The coiled packages of strand which are produced, must be dried prior to subsequent twisting and weaving operations, and during this drying operation, the movement of the fluid or solvent migrates to the surface of the package and carries along with it some of the solid materials which form the coating. This movement of the solid materials with the solvent is commonly called "migration." The art has long been concerned with the problem of migration and a considerable number of patents have been concerned solely with this single problem.

According to the concept of the present invention, a new and improved method of applying coating materials to fibers, and particularly glass fibers at forming, is provided which will allow the various already developed coating materials to be applied to the fibers in a manner which overcomes some of the problems which the prior art has tried to overcome by specially developed coating materials.

Accordingly, it is an object of the present invention to provide a new and improved method of applying coating materials to glass fibers at forming which substantially eliminates the spray and other types of loss of the coating material to the surrounding area.

Another object of the invention is the provision of a new and improved method of applying coatings to fibers which will allow a greater "concentration" of solids to be applied to the fibers.

Another object of the invention is the provision of a new and improved method of applying coatings to glass fibers at forming which substantially completely overcomes the problem of "migration."

A further object of the invention is the provision of a new and improved method of coating glass fibers at forming wherein the coating materials are applied to the individual filaments as a fluid which can be caused to gel quickly, and the filaments are thereafter immediately subjected to conditions which causes the coating material to gel.

Further objects and advantages of the invention will become apparent to those skilled in the art to which it relates from the following description of one embodiment of the method, as well as several materials which can be applied to the fibers according to the method of the invention.

SUMMARY

The objects of the present invention are achieved by reason of a gelling phenomenon. The coating materials are made to be capable of forming a gel when subjected to predetermined conditions. According to the invention, it has been found that many gels when in a gelatinous state cannot be depended upon to adequately coat the filaments or fibers. According to the method of the present invention, coating materials capable of forming gels are applied to the filaments or fibers under conditions wherein the materials are a solution or suspension and are immediately thereafter subjected to conditions which will change the materials to a gelatinous state. It is not believed necessary that the change to the gelatinous state be completed, in all instances, before the coated strand is wound into the coiled package, provided the gel is produced prior to the time that any appreciable amount of the solvent is lost from the package. In order to achieve a low degree of throw off or spray during the winding operation, the materials should preferably gel on the fibers or filaments before they are coiled into the package. Still other objects of the invention are achieved by the formation of super cooled gels, which gel before reaching the package, and which then exude liquids to the surface of the gel to separate the coatings of the individual coils of coated strand. The gel forming constituent of the coating material need not have the desired properties of the coating. In some instances, the desired properties of the coating can be provided by materials other than the gel former, and the gel former can be present solely for the purpose of producing the gel. The method of the present invention, therefore, is very flexible and permits coating materials having practically any desired properties to be produced. These coating materials are applied as a solution, and are immediately converted to a gel.

The amylose fraction of starch has proved highly satisfactory as a gel former in the practice of the invention and in addition exhibits the highly desirable qualities of conventional starch size compositions while remaining substantially devoid of migration tendencies. Also, amylose materials have actually enhanced the processing characteristics of fiber glass strands and yarns treated therewith by reducing fuzz level, providing uniform tension characteristics, enhancing breaking strengths and greatly diminishing the existence of color bands. In the present invention it should be noted that the term cooking is intended to connote particle breakdown with attendant conversion of the material to the form of a solution.

Experimentation has shown that preferred results are achieved when the starch fraction is employed in a proportion ranging between 2–7% by weight of the total composition or between 25–88% by weight of the non-aqueous or non-carrier constituent of the size composition.

Amylose gel forming size compositions of the invention may be enhanced by the addition of other materials such as emulsifiers, lubricants, additional film-forming material, oils, plasticizers, etc. The size compositions are preferably applied in a water base although equivalent materials may also be used. Suggested ranges for the aforementioned additives capable of being applied as dilute solutions are:

| | Percent by weight |
|---|---|
| Oils | 0.2–0 |
| Surfactant-emulsifiers | 0.1–1 |
| Lubricant-softeners | 0.1–1 |
| Additional film-forming materials | 0–0.4 |
| Plasticizers | 0–1.0 |
| Water | 87–98 |

While animal or vegetable oils are preferred, any oleaginous material may be employed as an emulsifier for the lubricant.

Although polyvinyl alcohol or gelatin are preferred as the supplemental film-forming materials, other film-formers such as copolymers of acrylonitrile and styrene, vinyl chlorides or nitriles; cellulose derivatives such as acetates, nitrates and alkyl cellulose; polyamides; polyalkylenes and their halogenated derivatives; vinyl compounds; polystyrene and the acrylates may be used.

Lubricants employed are preferably cationic materials such as condensates of tetraethylene pentamine with stearic or pelargonic acid which are solubilized with acetic acid. In addition, the chlorides, acetates, bromides, dibasic acid salts and other salts of other primary, secondary and tertiary amines, quaternary ammonium compounds, and of phosphonium and sulphonium compounds are applicable.

While polyalkylene glycols have been found efficient in the role of plasticizers, other compounds such as the fatty esters of the glycols, organo phosphates such as tricresyl phosphate, phthalic acid derivatives, chlorinated paraffins, other glycol and glycerol derivatives and the esters or derivatives of the following acids: adipic, fumaric, maleic, oleic, azelaic, benzoic, citric, sebacic, phosphoric, ricinoleic, stearic, sulfonic and tartaric, may also be used.

Although polyoxyalkylene compounds such as polyoxyethylene sorbitan monooleate are preferred as the surfactant-emulsifier, other equivalent compounds exhibiting similar functional characteristics are also capable of utilization.

DESCRIPTION OF PREFERRED EMBODIMENTS

The following examples set forth preferred formulations for amylose size compositions with which highly satisfactory results have been achieved (proportions are established in percentages by weight of the total compositions):

Example 1

| | Percentage by weight |
|---|---|
| Amylose | 5.0 |
| Vegetable oil | 2.0 |
| Polyoxyethylene sorbitan monooleate | 0.21 |
| Octadecyl amine acetate | 0.21 |
| Gelatin | 0.06 |
| Polyvinyl alcohol | 0.09 |
| Water | Remainder |

Example 2

| | |
|---|---|
| Amylose | 5.0 |
| Vegetable oil | 2.0 |
| Polyoxyethylene sorbitan monooleate | 0.2 |
| Octadecyl amine acetate | 0.5 |
| Polyethylene glycol | 0.5 |
| Water | Remainder |

The above compositions are prepared by adding the oil and polyoxyalkylene surfactant-emulsifier to a mixture of the starch fraction and water which has previously been agitated and heated. The cationic lubricant is then dissolved in warm water and added to the mix. The glycol plasticizer is then added. The mix is then brought to the required volume through the addition of water and the pH may be adjusted to 4.0 plus or minus .2 with phosphoric acid.

In the preparation of the amylaceous component, the composition is heated or cooked in water at the time of preparation of the size material, to approximately 290–340° F. and adequate agitation and recirculation must be maintained to prevent gelation, although in the event of thickening, the desired viscosity may be regained by remixing. Best results are obtained when the size compositions are applied at 120–150° F.

Application may be accomplished by any conventional method and satisfactory results have been reached with a standard apron applicator, of the general type disclosed by U.S. 2,873,718. In addition, pad type applicators such as those disclosed in U.S. 2,373,078, 2,390,370 and 2,392,805, or roller type applicators may be employed. Broadly, the size compositions of the invention may be applied at forming, or immediately subsequent thereto, through the use of conventional contact, spraying or immersion application apparatus. As disclosed in the above patents, the sizes are applied to the individual filaments before or as they are grouped into a strand. Present practice is to produce fibers ranging in diameter from 0.0001 to 0.0004 inch in diameter at speeds of from 10,000 to 15,000 feet per minute.

When starch solutions are produced in accordance with the procedure outlined above, and these solutions are applied to glass fibers as described above, a "supercooled" gel is formed on the fibers before they reach the package into which they are wound. Because this gel is formed so quickly by reason of the sudden drop in temperature that occurs after being applied to the fibers, a larger amount of cationic lubricant and non-ionic lubricant is trapped in the gel than can be retained by this gel when it has had time to become stable at room temperatures. The gel so produced has been called a "supercooled" gel, and this "supercooled" gel thereafter exudes some of the cationic and non-ionic lubricants to produce a thin layer of these materials in situ on the strands within the coiled package.

It has been known heretofore, that amylose will form tough films having properties similar to cellophane but these films cannot be used to protect glass fibers from abrasion, and to our knowledge such films have never been made or used, prior to the present invention, for a protective coating that is placed on glass fibers at forming.

According to further aspects of the invention, it has been found that cationic lubricants hydrogen bond to the amylose molecules when properly incorporated therein to soften the amylose gel in an unexpected manner, and provide a film having the necessary softness, flexibility, etc. for the protection of glass fibers through subsequent coiling, twisting, plying, and weaving operations. It has unexpectedly been found that the materials of the present invention have a lower fuzz level, and better processing effectiveness in subsequent twisting and weaving operations than do any prior art starch films with which applicants are aware. This is attributed to the fact that some of the cationic lubricant is chemically combined with the amylose molecules to modify the film and give it desirable properties, and in addition, is capable of producing a "supercooled" phenomenon wherein some of the cationic and non-ionic lubricants are thrown off in situ to give a uniform thin film of these materials on the surface after most of the water has been removed. This film of lubricants, therefore, is retained in subsequent twisting and weaving operations to a greater degree than in any other starch forming films with which we are aware.

It has been found that cationic lubricants progressively soften an amylose gel as the concentration of the cationic lubricant increases, and when an excessive amount is used, the cationic lubricant can prevent a gel from forming. The amount of cationic lubricant which will produce a given effect is dependent upon the concentration of the amylose material so that the amount of cationic lubricant which will prevent a gel from forming is dependent upon the amount of amylose present. It has also been found that non-ionic lubricants counteract the effect of the cationic lubricant, and that non-gelling compositions of amylose and cationic lubricants can be made to gel by adding non-ionic lubricant. The non-ionic lubricants appear to be associated with the cationic lubricants, and to decrease the mobility of the molecules of the cationic lubricant to thereby decrease the amount of hydrogen bonding between the cationic lubricant and amylose starch molecules. Cationic lubricant appears to penetrate between the straight chain molecules of amylose to hydrogen bond with the primary and secondary hydroxyl groups of the amylose molecule and to in this fashion be retained in position between the long chained molecules of amylose. The forces which attract the amylose molecules together cause the amylose molecules to resist the penetration of the cationic lubricants, and the non-ionic lubricants appear to decrease the mobility of the cationic lubricant to decrease the amount that is hydrogen bonded.

A temperature above approximately 250° F. is necessary before any appreciable amount of amylose starch granules are completely burst unless a solubilizing agent of the type taught by the Wolff and Gundrum Patent 2,608,723 is used. The complexing solubilizing materials taught in that patent are lower molecular weight alcohols, and the patent teaches the solubilizing of amylose at a temperature of from 80 to 85° centigrade. Such materials produce inferior coatings on glass fibers, and what is more, the lower molecular weight alcohols interfere with the hydrogen bonding of the cationic lubricants, so that films having the desired coating of lubricants are not produced.

While "supercooled" gels can be formed over the ranges specified above, the most preferred protective films on glass fibers generally comprise from 2% to 5% amylose. Where a solution of 2% amylose is used, the cationic lubricant should preferably be between 0.01 pound of cationic lubricant per pound of starch, and 0.04 pound of cationic lubricant per pound of starch. Where a 5% solution of amylose is used, the cationic lubricant should preferably be between 0.02 pound of lubricant per pound of starch and 0.08 pound of lubricant per pound of starch.

Where 0.01 pound of cationic lubricant per pound of starch is used, the non-ionic lubricant should preferably be above approximately 0.10 pound per pound of starch, and because excessive amounts of non-ionic lubricant produce excessively high tensions in later twisting, plying and weaving operations, the non-ionic lubricant should preferably be kept below 0.35 pound per pound of starch.

The following is an example of another material which can be applied to the glass fibers as a hot solution, which then is immediately cooled to form a gel. In the following example, gelatin is used as the gel former.

Example 3

| | Percentage by weight |
|---|---|
| Polyethylene emulsion (M.W. of 1,800–23.25% solids) | 4.0 |
| Polyethylene amine in isopropanol (M.W. of 1,500–60% solids) | 1.4 |
| Polyethylene glycol (M.W. of 500+) | 1.25 |
| Gelatin | 2.6 |
| Sorbitol | 0.4 |
| $H_3PO_4$ | (1) |
| Water | Balance |

[1] Trace to provide 4.2 pH.

The above materials are prepared by dissolving the gelatin in water at 150° F. The polyglycol is dissolved in another vessel using water at 150° F. and to which the $H_3PO_4$ is added. The acidified polyglycol material as well as the other ingredients are thereafter added to the gelatin solution and the total composition thoroughly mixed using a Waring Blendor.

This material was applied to glass fibers at a temperature of 130° F. using a belt type applicator having an apron speed of 15 feet per minute. The fibers coated with this material when coiled into a package gave an extremely low rate of migration. In one instance, the material at the inside of the package had an ignition loss of 0.62% while the material at the outside of the package had an ignition loss of 0.60%.

The following is an example of another composition using another type of gel former which can be applied to the fibers as a hot solution and then cooled to form a gel.

Example 4

| | Percentage by weight |
|---|---|
| Polyethylene glycol (M.W. of 500+) | 2.4 |
| Polyethylene amine in isopropanol (M.W. 1,500–60% solids) | 1.4 |

A solution of the polyglycol was prepared using water at 150° F. The material was thoroughly mixed using a Waring Blendor following which the $H_3PO_4$ was added to the polyglycol to provide a pH of 4.0. Thereafter the other ingredients were added and the composition applied to glass fibers at forming at a temperature of 130° F. using an apron speed of 12 feet per minute. Glass fibers coated as above described and coiled into a package had an ignition loss of the outside of the package of 0.40, and an ignition loss at the inside of the package of 0.35.

The following example demonstrates that gel forming materials can be used to carry other solids with them in the formation of a gel on the surface of glass fibers.

Example 5

| | Percentage by weight |
|---|---|
| Polyethylene glycol (M.W. 500) | 2.5 |
| Polyethylene amine in isopropanol (M.W. 1,500–60% solids) | 1.4 |
| Polyethylene emulsion (M.W. 1,800–23.25% solids) | 6.0 |
| $H_3PO_4$ | (1) |
| Water | Balance |

[1] Trace to provide 4.4 pH.

The above materials were mixed in the same manner as above described and were applied to glass fibers at 130° F. with an apron speed of 12 feet per minute. Glass fibers coated with this material when coiled into a package gave an ignition loss at the outside of the package of .58 and an ignition loss at the inside of the package of 0.44.

The following example demonstrates that gel formers can be used to deposit and hold materials in the form of an emulsion in place on the glass fibers.

Example 6

| | Percentage by weight |
|---|---|
| Paraffin wax emulsion (50% solids) | 6.0 |
| Polyethylene amine (M.W. 1,500) | 1.0 |
| Gelatin | 3.0 |
| Glycerin | 1.5 |
| Lauryl sulfonate | 0.1 |
| $H_3PO_4$ | (1) |
| Water | Balance |

[1] A trace to provide a pH of 4.2.

This material was prepared in generally the same manner as above described and was applied to glass fibers at a temperature of 96° F. The fibers coated therewith when coiled into a package had a migration ratio of 1.30. The wax emulsion was spaced throughout the gel on the fibers as discrete particles, and the gel held these particles in position to give the low migration ratio. The spaced apart wax particles surrounded by the gelatin provided a beneficial lubricating effect. The composition demonstrates that emulsions can be beneficially held by gel formers to give coating compositions whose properties can be largely determined by materials forming the emulsion.

The following example is *not* according to the invention and demonstrates the benefit of a gel former.

Example 7

| | Percentage by weight |
|---|---|
| Paraffin wax emulsion (50% solids) | 4.5 |
| Polyethylene amine (M.W. 1,500) | 1.0 |
| Animal protein | 2.25 |
| Glycerin | 1.0 |
| Igepal | 0.1 |
| $H_3PO_4$ | (1) |
| Water | Balance |

[1] Trace to provide 5.2 pH.

This material was prepared in generally the same manner indicated above, and gave a migration ratio of approximately 5.0.

The following example indicates that materials having a high solid ratio can be applied using the gelling phenomenon.

Example 8

| | Percentage by weight |
|---|---|
| Paraffin wax emulsion (50% solids) | 5.5 |
| Polyethylene amine (M.W. 1,500) | 0.75 |
| Gelatin | 2.25 |
| Polyethylene glycol | 33.3 |
| Lauryl sulfonate | 0.1 |

This material was prepared in generally the same manner as indicated above and was applied to glass fibers at forming at a temperature of approximtely 90° F. The coated fibers were immediately thereafter coiled into a package which had a migration ratio of 2.04.

The following is an example wherein polyvinyl alcohol is used as the gel forming material.

Example 9

| | Percentage by weight |
|---|---|
| Polyvinyl alcohol (M.W. 1,500) | 4.5 |
| Titanium lactate | 1.33 |
| Polyethyleneamine (N.W. 1,500) | 12.00 |
| Hydrogenated coconut oil | 2.00 |
| Water | 80.17 |

The following is an example of a gel forming composition that utilizes an organic solvent.

Example 10

| | Percentage by weight |
|---|---|
| Polyacrylic acid (M.W. 1,000) | 3.0 |
| Ammonia (saturated water solution) | 2.0 |
| Mineral spirits | 46.0 |
| Water | 49.0 |

Very little of the coating materials which are applied to glass fibers as a solution and are immediately caused to gel are lost in the forming operation. Because the forming efficiency is high, costly materials, the cost of which has prevented their being used commercially heretofore, can now be used economically by the process of the present invention. The process of the present invention is versatile in that it can be used to apply many types of materials, either as true solutions or as emulsions or dispersions spaced throughout the gel forming material, so that a wide variety of properties can be achieved by the coatings. Since a high percent of solids can be carried along with the gel forming material, coatings having a higher solids ratio than the prior art can be applied by the process of the present invention.

It will be apparent, therefore, that the objects heretofore enumerated as well as others have been accomplished, and that there has been provided a new and improved method of applying coating materials to glass fibers at forming, in which the coating materials are applied to the fibers as a solution and immediately caused to gel. This gelling takes place prior to the removal of any appreciable amount of solvent from the coating, and/or reaction of the coating materials after application to the fibers.

We claim:

1. The method of producing a migration resistant coating on glass fibers, said method comprising: solubilizing a starch material comprising a major proportion of chemically unmodified amylose in water to provide a solution of from approximately 2% to approximately 7% of amylose by weight and which will form a gel at room temperature, incorporating a cationic lubricant and a nonionic lubricant into the solution in amounts above that which the material will hold at room temperature when in the form of a stable gel, applying the mixture to glass fibers at forming at a temperature above the gelatinizing temperature to coat the fibers, cooling the coated fibers to produce a "supercooled" gelling of the mixture, and coiling the coated fibers after the "supercooled" gel has formed into a coiled package.

2. The method of claim 1 wherein the solubilizing step is accomplished by heating the chemically unmodified amylose in the presence of $H_2O$ at a temperature above approximately 250° F.

3. The method of claim 2 wherein the solution consists essentially of from 2 to 5 percent by weight of amylose, from 0.01 to 0.08 pound of a cationic lubricant per pound of amylose, and from 0.10 to 0.35 pound of a non-ionic lubricant per pound of amylose 4. Glass fibers coated with a "supercooled" gel consisting essentially of from approximately 2 percent to approximately 5 percent of chemically unmodified amylose, from approximately 0.01 to approximately 0.08 pound of a cationic lubricant per pound of amylose, and from approximately 0.10 to approximately 0.25 pound of a non-ionic lubricant per pound of amylose.

5. The glass fibers of claim 4 wherein coloring materials are incorporated into the gel.

6. A method of coating fibers formed under ambient conditions comprising: solubilizing coating materials including a gel-forming material from the group consisting of chemically unmodified amylose, polyvinyl alcohol, polyethylene glycol, animal protein, and polyacrylic acid in an amount to produce a solution which gels immediately under said conditions, delivering said gelable coating material to an applicator, pulling fibers over said applicator in contact with said gelable coating material under conditions in which said gelable coating material is a solution, immediately subjecting the coated fibers to said conditions which cause said coating material to gel, and immediately coiling said coated fibers into a package.

7. The method of claim 6 wherein the coating on said fibers is caused to gel before the fibers are coiled into the package.

8. A method of coating fibers with non-gelling materials comprising: including a gel-forming material with said non-gelling material and a solvent for said gel-forming material to form a material which gels immediately when subjected to ambient conditions, solubilizing said gel-forming material and intimately mixing said non-gelling material therewith, delivering the intimate mixture to an applicator, pulling glass fibers over said applicator in contact with said intimate mixture under conditions in which said gel-forming material is a solution, immediately subjecting the coated fibers to said ambient conditions which cause said coating material to gel, and immediately coiling said coated fibers into a package.

9. The method of claim 8 wherein said solution gels upon cooling below a generally predetermined temperature, and wherein the coating on said fibers is cooled below said predetermined temperature before being coiled into a package.

10. The process of claim 9 wherein said solvent is a mutual solvent of said gellable and non-gellable material.

11. The process of claim 9 wherein said non-gellable material is a solidifiable firm former, and wherein said film former is caused to solidify after said gellable material has formed a gel on said fibers.

12. The method of claim 6 wherein said solubilizing step is accomplished using chemically unmodified amylose in an amount which produces a material which gels immediately when cooled to ambient conditions.

References Cited

UNITED STATES PATENTS

| 2,608,723 | 9/1952 | Wolff et al. | 106—213 |
| 2,993,872 | 7/1961 | Gagnon et al. | 106—210 |
| 3,051,700 | 8/1962 | Elizer et al. | 106—210 |
| 3,048,466 | 8/1962 | Tiede | 65—3 |

S. LEON BASHORE, Primary Examiner

R. L. LINDSAY, Jr., Assistant Examiner

U.S. Cl. X.R.
106—211, 213; 117—126